US009142998B2

(12) United States Patent
Yu et al.

(10) Patent No.: US 9,142,998 B2
(45) Date of Patent: Sep. 22, 2015

(54) WIRELESS ENERGY TRANSFER

(71) Applicant: The Board of Trustees of the Leland Stanford Junior University, Palo Alto, CA (US)

(72) Inventors: Xiaofang Yu, San Mateo, CA (US); Sunil Sandhu, Stanford, CA (US); Sven Beiker, Palo Alto, CA (US); Richard E. Sassoon, Redwood City, CA (US); Shanhui Fan, Stanford, CA (US); Torbjorn Skauli, Oslo (NO)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 413 days.

(21) Appl. No.: 13/573,725

(22) Filed: Oct. 3, 2012

(65) Prior Publication Data

US 2014/0021907 A1 Jan. 23, 2014

Related U.S. Application Data

(60) Provisional application No. 61/542,667, filed on Oct. 3, 2011.

(51) Int. Cl.

| | |
|---|---|
| ***H02J 7/02*** | (2006.01) |
| ***H02J 5/00*** | (2006.01) |
| ***H02J 17/00*** | (2006.01) |

(52) U.S. Cl.
CPC ................. *H02J 7/025* (2013.01); *H02J 5/005* (2013.01); *H02J 17/00* (2013.01)

(58) Field of Classification Search
CPC ............ H02J 17/00; H02J 5/005; H02J 7/025
USPC .................................. 320/107, 108; 307/104
See application file for complete search history.

(56) References Cited

U.S. PATENT DOCUMENTS

| | | | |
|---|---|---|---|
| 8,030,888 | B2 | 10/2011 | Pandya et al. |
| 2010/0231163 | A1 | 9/2010 | Mashinsky |
| 2010/0237706 | A1 | 9/2010 | Karalis et al. |
| 2011/0187320 | A1 | 8/2011 | Murayama |
| 2011/0254503 | A1 | 10/2011 | Widmer et al. |
| 2011/0291615 | A1 | 12/2011 | Pandya et al. |
| 2012/0119698 | A1 | 5/2012 | Karalis et al. |
| 2012/0206098 | A1 | 8/2012 | Kim |

OTHER PUBLICATIONS

W. Brown, IEEE Trans. Microwave Theory and Techniques 32, 1230 (1984).

U. S. Inan and A. S. Inan, Engineering Electromagnetics (Addison-Wesley, Reading, MA, 1999).

(Continued)

*Primary Examiner* — Sun Lin
(74) *Attorney, Agent, or Firm* — Crawford Maunu PLLC

(57) ABSTRACT

Electromagnetic energy transfer is facilitated. In accordance with an example embodiment, a first resonator transmits electromagnetic energy using an electromagnetic wave, based on frequency matching and alignment of an electromagnetic field with a second resonator within a distance of one wavelength of the electromagnetic wave from the first resonator. An electromagnetic energy reflector adjacent the first resonator redirects reflected portions of the electromagnetic wave back towards the first resonator.

23 Claims, 3 Drawing Sheets

(56) References Cited

OTHER PUBLICATIONS

S. Sood, S. Kullanthasamy, and M. Shahidehpour, in IEEE Power Engineering Society General Meeting (IEEE, San Francisco, CA 2005), vol. 1, pp. 605-610.
C. Zhu, K. Liu, C. Yu, R. Ma, and H. Cheng, in Proceedings of the IEEE Vehicle Power and Propulsion Conference (IEEE, Harbin, China 2008), pp. 1-4.
J. Muhs, E. C. Fox, "Automated Electric Transportation, Transforming America's Transportation Future", Utah State University Energy Lab, Oak Ridge National Laboratory (2009).
L. Peng, O. Breinbjerg, and N. Mortensen, J. Electromagn. Waves Appl. 24, 1587 (2010).
A. RamRakhyani, S. Mirabbasi, and M. Chiao, IEEE Trans. Biomedical Circuits and Systems 5, 48 (2011).
H. H. Wu, A. Gilchrist, K. Sealy, P. Israelsen, and J. Muhs, in Proceedings of the IEEE International Electric Machines and Drives Conference (IEEE, Niagara Falls, ON 2011), pp. 143-147.
J. Boys and G. Covic, "Ipt roadway topologies," Conference on Electric Roads and Vehicles (2012).
http://en.wikipedia.org/wiki/Electric_car#Currently_available_electric_cars.
http://www.teslamotors.com/buy/buyshowroom.php.
Delphi, "Electric Vehicle Charging Systems," (www.delphi.com/manufacturers/auto/hevevproducts/charging-cordsets/wrls-chrg/).
"Delphi Wireless Charging System," www.delphi.com.
D. Poetor, "Qualcomm to Demo Wireless Charging Tech for Electric Cars," (2012) www.pcmag.com/article2/0,2817,24007586,00.asp.
"5 Reasons to Buy an Electric Car and 5 Reasons Not to", http://www.buyelectriccar.net/page2.html.
H. Haus, Waves and Fields in Optoelectronics (Prentice-Hall, Englewood Cliffs, NJ, 1984).
A. Kurs, A. Karalis, R. Moffat, J. D. Joannopoulos, P. Fisher, M. Soljacic, "Wireless power transfer via strongly coupled magnetic resonances", Science, vol. 317, p. 83-86 (2007).
A. Karalis, J. D. Joannopoulos and M. Soljacic, "Efficient wireless non-radiative midrange energy transfer", Annals of Physics, vol. 323, p. 34-48 (2008).
D. Pepper, "Delhi Vs. Detroit?", Newsweek, Apr. 2, 2009, http://www.newsweek.com/id/192145.
R. E. Hamam, A. Karalis, J. Joannopoulos, and M. Soljacic, "Efficient weakly-radiative wireless energy transfer: An EIT-like approach", Ann. Phys. 324, 1783 (2009).
M. Budhai, G. Covic, J. Boys, "Design and Optimisation of Magnetic Structures for Lumped Inductive Power Transfer System," IEEE (2009) pp. 2081-2088.
B. Wang, K. H. Teo, T. Nishino, W. Yerzunis, J. Barnwell, and J. Zhang, "Experiements on Wireless Power Transfer with Metamaterials", Appl. Phys. Lett. 98, 254101 (2011).
X. Yu, S. Sandhu, S. Beiker, R. Sasson, and S. Fan, "Wireless Energy Transfer With the Presence of Metallic Planes," Appl. Phys. Lett. 99, 214102 (2011).
Y. Urzhumov and D. R. Smith, "Metamaterial-Enhanced Coupling between Magnetic Dipoles for Efficient Wireless Power Transfer", Phys. Rev. B 83, 205114 (2011).
A.E. Umenei, "Understanding Low Frequency Non-Radiative Power Transfer," Fulton Innovation (Jun. 2011).
M. Schwartz, "Wireless Power Could Revolutionize Highway Transportation, Stanford Researchers Say," Stanford Report (Feb. 1, 2012) (www.news.stanford.edu/news/2012/february/wireless-vehicle-charge-020112.html).

WIRELESS ENERGY TRANSFER

RELATED DOCUMENT

This patent document claims the benefit under 35 U.S.C. §119 of U.S. Provisional Patent Application Ser. No. 61/542,667 entitled "Wireless Energy Transfer" and filed on Oct. 3, 2011; this patent document is fully incorporated herein by reference.

FIELD

The present disclosure is directed wireless energy transfer, such as electromagnetic energy transfer.

BACKGROUND

Wireless energy transfer has seen a strong interest in recent years. For example, wireless energy transfer has been implemented for hand-held type devices, such as computing or gaming devices, for charging a battery. Respective high-quality factor (Q-factor) LC resonators can be used to achieve such transfer, in which each resonator includes an inductor and a capacitor.

While such energy transfer has been useful for certain applications, power transfer has been challenging in a variety of applications. For example, such energy transfer must be effected in a safe manner, and often requires minimization of interference. Further, when transfer is not in free space (e.g., reflective/conductive bodies may interfere), the transfer can be challenging to effect. Transferring energy in complex electromagnetic environments can be challenging. These and other matters have been challenging to address.

SUMMARY

Aspects of the present disclosure relate generally to wireless energy transfer, and to addressing challenges such as those discussed above.

In accordance with an example embodiment, an apparatus includes a first resonator circuit that transmits electromagnetic energy using an electromagnetic wave, based on frequency matching and alignment of an electromagnetic field with a second resonator circuit. The energy transfer is effected at a distance between the resonators that is within one wavelength of the electromagnetic wave. An electromagnetic energy reflector is located adjacent the first resonator redirects reflected portions of the electromagnetic wave, which are reflected towards the first resonator circuit, back towards the second resonator circuit to facilitate highly efficient absorption of the electromagnetic energy wave by the second resonator circuit.

Another embodiment is directed to an apparatus having a charging circuit, first and second high Q resonator circuits, and an electromagnetic energy reflector, the first high Q resonator circuit being coupled to a reflective body (e.g., a device or vehicle). Each of the high Q resonator circuits has a capacitor with opposing capacitive plates and an inductive coil connected to the capacitive plates. The first high Q resonator circuit is connected to the charging circuit and provides received sub-wavelength electromagnetic energy to the charging circuit. The second high Q resonator circuit transmits the sub-wavelength electromagnetic energy to the first high Q resonator, by passing an electromagnetic wave in an electromagnetic field aligned between the first and second high Q resonator circuits via parallel alignment of the capacitors and parallel alignment of the inductive coils, using a resonant frequency matched to a resonant frequency of the first high Q resonator. The reflective body reflects a portion of the electromagnetic energy transmitted by the second high Q resonator. The electromagnetic energy reflector and the reflective body reflect the electromagnetic energy transmitted by the second high Q resonator circuit between one another until the first high Q resonator circuit receives nearly all of the electromagnetic energy transmitted by the second high Q resonator circuit.

The above summary is not intended to describe each embodiment or every implementation of the present disclosure. The figures, detailed description and claims that follow more particularly exemplify various embodiments.

BRIEF DESCRIPTION OF THE DRAWINGS

Aspects of the present disclosure may be more completely understood in consideration of the detailed description of various embodiments of the present disclosure that follows in connection with the accompanying drawings, in which.

Figure 1:
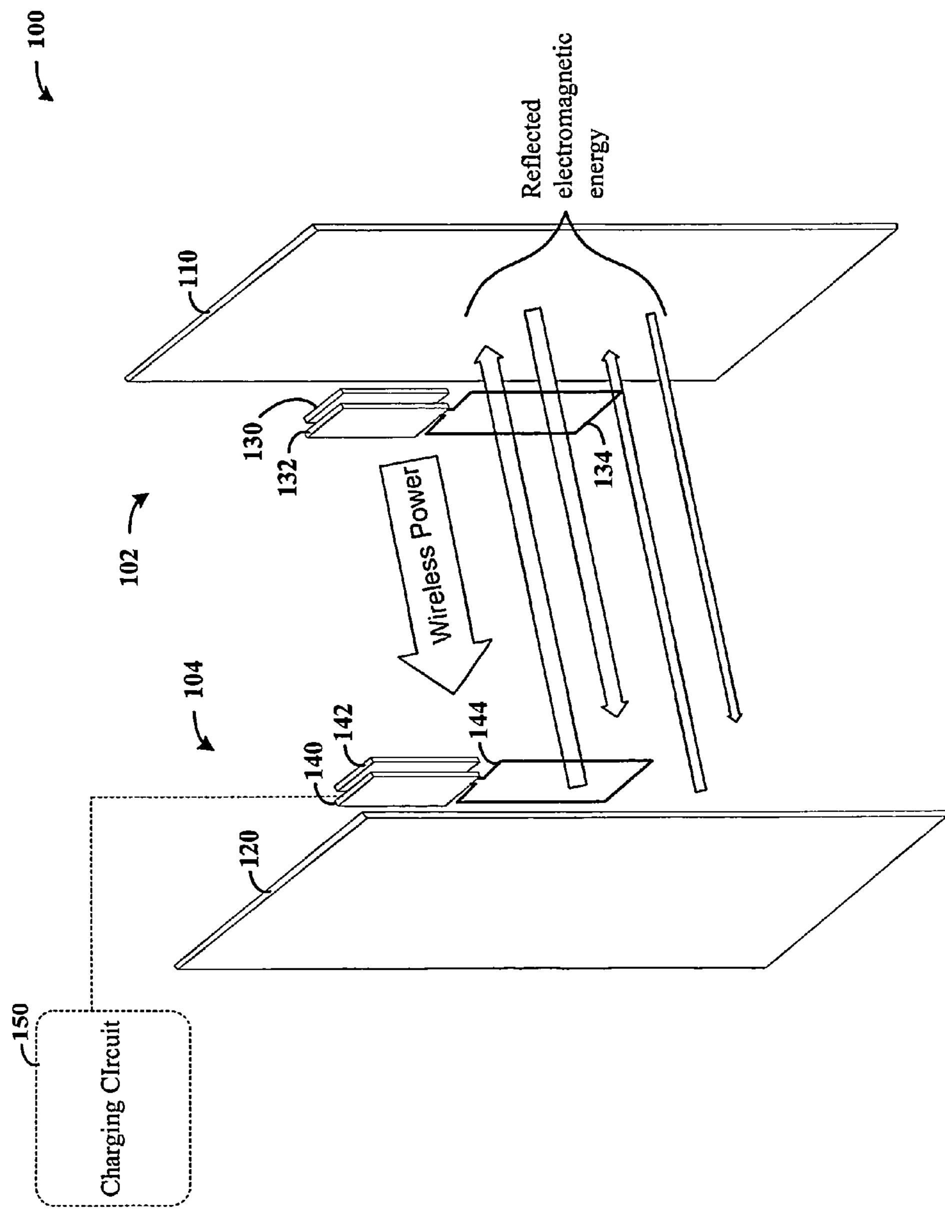
FIG. 1 shows an electromagnetic energy transfer apparatus, according to an example embodiment of the present invention.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

DETAILED DESCRIPTION

The present disclosure relates to wireless energy transfer. While the present disclosure is not necessarily limited to such devices and applications, various aspects of the disclosure may be appreciated through a discussion of examples using these and other contexts.

Various example embodiments are directed to one or both of the transmission and reception aspects of wireless power transfer, with further embodiments directed to other aspects for delivering the power that is transmitted and/or to using the power that is received. These and other embodiments can be utilized to wirelessly charge a variety of circuits, such as a laptop or a vehicle charging circuit.

Various aspects of the present disclosure are directed towards mid-range wireless power transfer. In certain embodiments, two high-quality factor (Q-factor) LC resonators, acting as the source and the receiver, are provided. Each resonator includes an inductor and a capacitor (e.g., two conductive plates). In certain specific embodiments, the inductor includes a square-shaped planar single-loop coil of wire that generates a magnetic dipole moment. Power transfer between the resonators occurs in the near-field regime through a magnetic field. The use of magnetic field as the coupling mechanism is safe, and also minimizes interference effect by off-resonant external dielectric objects.

In one embodiment, a resonator circuit transmits electromagnetic energy to another resonator circuit using an electromagnetic wave, using frequency matching and alignment of an electromagnetic field between the resonator circuits. The transmission is effected with the resonator circuits being within one electromagnetic wave-wavelength (distance) of each other. An electromagnetic energy reflector is located adjacent the transmitting resonator to redirect portions of the electromagnetic wave that are not absorbed by the resonator circuit and are instead reflected back to the source. In some implementations, the energy transfer is effected via high Q resonator characteristics and via the transmission of sub-wavelength electromagnetic energy using an electric dipole moment that is about perpendicular to the electromagnetic energy reflector. With these approaches, absorption of nearly all of the transmitted electromagnetic energy is facilitated.

The transmitting resonator circuit is implemented in a variety of manners, to suit particular embodiments. In some embodiments, the transmitting resonator circuit and the electromagnetic energy reflector are embedded within a surface upon which vehicles pass, and transmit sub-wavelength electromagnetic energy to resonator circuits in vehicles passing over the surface. In other embodiments, the transmitting resonator circuit transmits the electromagnetic energy at a distance between the resonators of at least 10 centimeters and less than one-tenth of the wavelength of the electromagnetic wave. In certain embodiments, the transmitting resonator circuit maintains symmetry between the resonator circuits by automatically frequency-matching the resonator circuits, and/or by adjusting the size of its inductive coil (i.e., with each resonator having a capacitor with each capacitor plate connected to an end of the inductive coil).

In some embodiments, both the transmitting and receiving resonators have capacitive plates and an inductive coil, with the capacitive plates all being in parallel with one another and the inductive coils being in parallel with one another as well. In some implementations, the electromagnetic energy reflector also includes a planar conductive plate in parallel to the capacitive plates of both resonators. In other implementations, the electromagnetic energy reflector includes a planar conductive plate in parallel to the capacitive plates and inductive coils of both resonators. In still other implementations, the electromagnetic energy reflector includes a planar conductive plate perpendicular to the capacitive plates of both resonators and parallel to the inductive coils of both resonators.

Another example embodiment is directed to a system including a plurality of charging stations coupled to a power supply, each of the charging stations including a resonator circuit that transmits electromagnetic energy using an electromagnetic wave, based on frequency matching and alignment of an electromagnetic field with a second resonator circuit. The respective resonator circuits are separated by a distance that is within one wavelength of the electromagnetic wave, and the second resonator circuit uses the transmitted energy to store charge for operating a vehicle. An electromagnetic energy reflector adjacent the resonator circuit redirects reflected portions of the electromagnetic wave back towards the first resonator circuit to facilitate high absorption of the electromagnetic energy wave by the second resonator circuit. An identification circuit wirelessly communicates with a circuit within the vehicle, and determines an identification of the vehicle therefrom. A metering device meters energy transferred to the second resonator circuit in the vehicle, and facilitates the communication of data for assessing a fee for the transferred energy, based on the determined identification.

Another example embodiment is directed to a method for transferring electromagnetic energy. Sub-wavelength energy is transmitted from a first high Q resonator circuit to a second high Q resonator circuit connected to a charging circuit and a reflective body (e.g., housing, vehicle) that reflects a portion of the energy, with each resonator having a capacitor with opposing capacitive plates and an inductive coil connected to the capacitive plates. To effect the transmission, an electromagnetic wave is passed in an electromagnetic field aligned between the first and second high Q resonator circuits via parallel alignment of the capacitors and parallel alignment of the inductive coils, using a resonant frequency matched to a resonant frequency of the first high Q resonator. The reflected portions of the electromagnetic energy are reflected back towards the second high Q resonator circuit (e.g., using an electromagnetic energy reflector), to facilitate reception of energy by the second high Q resonator circuit, which did not absorb the energy upon transmission, such that the second high Q resonator circuit receives nearly all of the electromagnetic energy transmitted by the first high Q resonator circuit.

Turning now to the figures, FIG. 1 shows an electromagnetic energy transfer apparatus 100, according to an example embodiment of the present invention. The apparatus 100 includes high Q resonator circuits 102 and 104, each having parallel capacitive plates 130/132 and 140/142, and an inductive coil 134 and 144. The high Q resonator circuit 104 is also shown connected to a charging circuit 150 (e.g., to power a circuit or charge a battery). The high Q resonator circuit 102 transmits sub-wavelength electromagnetic energy to the high Q resonator circuit 104, which provides the received energy to the charging circuit 150. The sub-wavelength electromagnetic energy is transmitted by passing an electromagnetic wave in an electromagnetic field aligned between the high Q resonator circuits via parallel alignment of the capacitors and parallel alignment of the inductive coils. This is accomplished using a resonant frequency matched to a resonant frequency of the high Q resonator 104.

A reflective body 120 reflects a portion of the electromagnetic energy back toward the second high Q resonator circuit, and an electromagnetic energy reflector 110 (e.g., a planar conductive plate) redirects electromagnetic energy initially transmitted by the high Q resonator circuit 102, back toward the high Q resonator circuit 104 (e.g., via an electric dipole moment that is about perpendicular to the reflectors 110 and 120). This respective transmission and reflection is represented by arrows, with more and more of the energy being absorbed each time the wave passes to the high Q resonator circuit 104. Using this approach involving alignment of both resonators and a reflector, the high Q resonator circuit 104 receives the transmitted electromagnetic energy at an enhanced transfer efficiency (e.g., 4-5% greater), which can be used to achieve a transfer efficiency of at least 90%, at least 94% or at least 96%.

Figure 2:
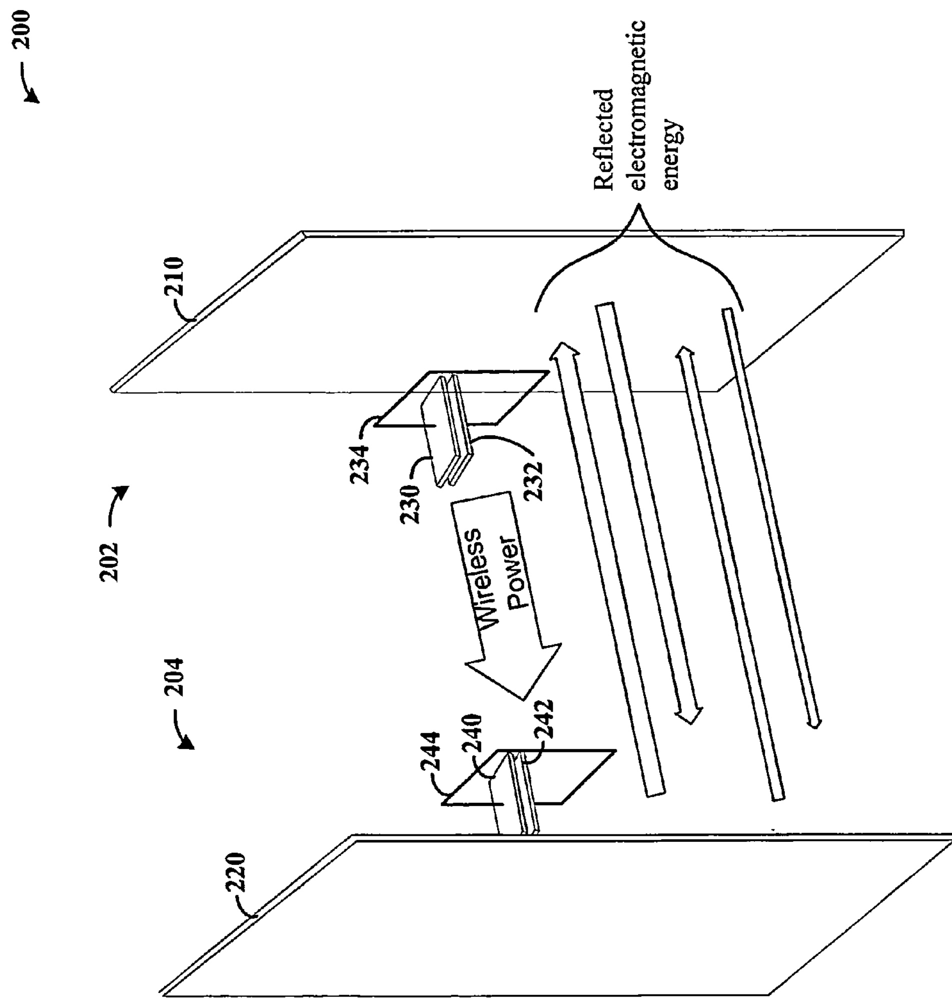
FIG. 2 shows another electromagnetic energy transfer apparatus, according to an example embodiment of the present invention.

FIG. 2 shows another electromagnetic energy transfer apparatus 200, according to an example embodiment of the present invention. The apparatus 200 is similar to the apparatus 100 shown in FIG. 1, with similar components being similarly labeled (e.g., components 110 and 210 are similar). Accordingly, the embodiments discussed above in connection with FIG. 1 may also be applied here. Each resonator 202 and 204 again has capacitive plates 230/232 and 240/242, and inductive coils 234 and 244. However, while the inductive coils 234 and 244 are similarly arranged relative to FIG. 1 (about parallel to reflectors 210 and 220), the capacitive plates are about perpendicular to the reflectors 210 and 220. All capacitive plates are still about parallel.

Figure 3:
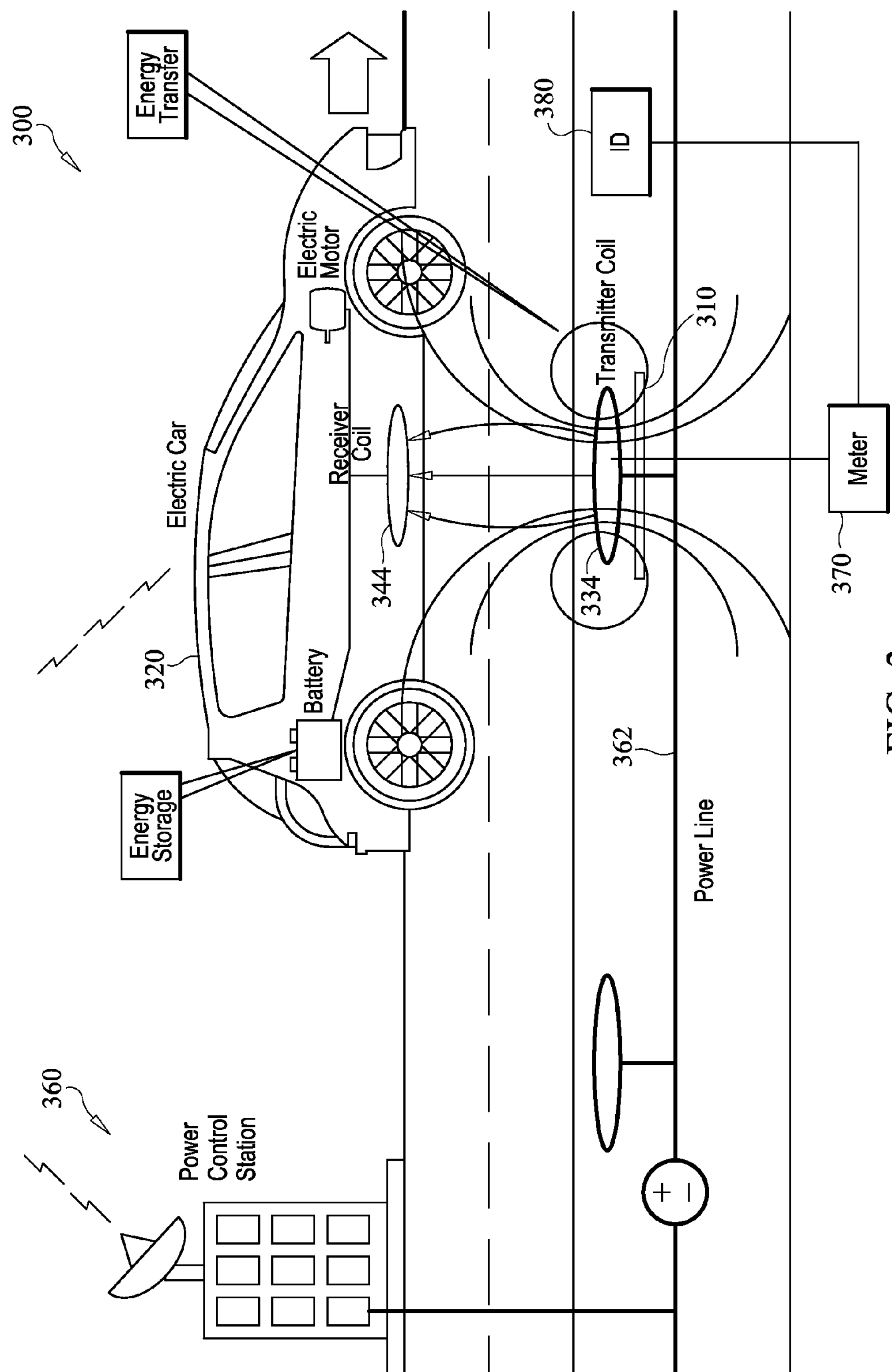
FIG. 3 shows a vehicular electromagnetic energy transfer apparatus and system, in accordance with another example embodiment of the present invention.

FIG. 3 shows a vehicular electromagnetic energy transfer apparatus and system 300, in accordance with another example embodiment of the present invention. The system 300 includes a transmitter coil 334 that transmits wireless energy to coil 344, using one or more approaches as discussed herein, to a vehicle 320. An electromagnetic reflector 310 is buried below the transmitter coil 334, and reflects electromagnetic energy that is reflected back from the vehicle 320, again back to the vehicle 320 for absorption at coil 344. In some implementations, the transmitter coil 334 operates to adjust its coil size to match the size of a coil in the vehicle 320, to facilitate efficient electromagnetic coupling. The energy is provided from a power control station 360, via a power distribution network 362.

In some embodiments, a metering device 370 meters power provided to the vehicle 320. In a more particular embodiment, an identification device 380 wirelessly identifies the vehicle 320, such as for assessing a fee for the transmitted power, such as by communicating with a wireless circuit in the vehicle 320. Such a wireless circuit may, for example, include a radio frequency identification circuit, or other wireless-communication circuit.

The vehicle 320 includes a motor and/or a charge storage device and a drive system that moves the vehicle. In some embodiments, the storage device is charged with energy using the energy received from the second high Q resonator circuit by the first high Q resonator circuit and provided to the charging circuit (the vehicle also includes the reflective body). In other embodiments, the transferred power is used to actively power a motor used to propel the vehicle 320.

Various embodiments herein, including those discussed with the figures above, may be implemented with resonators and reflective metallic back planes in which the resonators exhibit electric and magnetic dipole moments that are parallel to each other, and both being perpendicular to the metallic plane. Using this configuration, a mechanism for the wireless energy transfer is implemented using a coupled mode as follows. For a system including a source resonator (denoted with subscript s) and a receiver resonator (denoted with subscript r), the following equations exemplify the coupled mode:

$$\dot{\alpha}_s(t)=(i\omega_s-\gamma_s)\alpha_s(t)+i\kappa\alpha_r(t), \tag{1}$$

$$\dot{\alpha}_r(t)=(i\omega_r-\gamma_r-\gamma_w)\alpha_r(t)+i\kappa\alpha_s(t), \tag{2}$$

where $|\alpha a_{s,r}|^2$ corresponds to the energy stored in the resonator, $\omega_{s,r}$ is the resonant frequency, $\gamma_{s,r}$ is the intrinsic (e.g., absorption, radiation) loss rate, $\gamma_w$ is the work extraction rate due to an output load that couples to the receiving resonator, and $\kappa$ is the coupling coefficient.

Certain embodiments are implemented with a continuous-wave (CW) mode, where the source resonator couples to a CW input source that oscillates at the frequency $\omega_s$ such that the coupling between the CW source and the source resonator is maximized. Accordingly, the fraction of the total power that is dissipated at the load is $$f = \frac{\gamma_w|a_r^2|}{\gamma_s|a_s^2| + (\gamma_r+\gamma_w)|a_r^2|} = \frac{\frac{\kappa^2}{\gamma_s\gamma_r}\frac{\gamma_w}{\gamma_r}}{\left(1+\frac{\gamma_w}{\gamma_r}\right)\frac{\kappa^2}{\gamma_r\gamma_s} + \left(\frac{\omega_s-\omega_r}{\gamma_r}\right)^2 + \left(1+\frac{\gamma_w}{\gamma_r}\right)^2}. \tag{3}$$

This fraction f depends on the load through $\gamma_w$ and is maximized when $\gamma_w^{max}/\gamma_r=[1+\kappa^2/(\gamma_s\gamma_r)+(\omega_s-\omega_d)^2/\gamma_r^2]^{1/2}$. The transfer efficiency is defined as:

$$\eta = f(\gamma_w^{max}) = \frac{\frac{\kappa^2}{\gamma_s\gamma_r}}{2+\frac{\kappa^2}{\gamma_s\gamma_r}+2\sqrt{1+\frac{\kappa^2}{\gamma_s\gamma_r}+\left(\frac{\omega_s-\omega_r}{\gamma_r}\right)^2}} \tag{4}$$

The transfer efficiency, therefore, is determined by the intrinsic parameters of the coupled resonator system. Accordingly, it is advantageous to have $\omega_r=\omega_s$, and to operate in the strong coupling regime with $\kappa>>\gamma_{s,r}$.

These intrinsic parameters ($\omega_{s,r}$, $\gamma_{s,r}$, $\kappa$) are determined by operating the system in the absence of the load (i.e., $\gamma_s=0$). The system is initiated such that $\alpha_s(t=0)=1$, $\alpha_r(t=0)=0$. By setting these parameters, the following equations result from Equations (1) and (2):

$$a_s(t) = \frac{\omega_s-\omega_2+i\gamma_s}{\omega_1-\omega_2}e^{i\omega_1 t} + \frac{\omega_1-\omega_s-i\gamma_s}{\omega_1-\omega_2}e^{i\omega_2 t}, \tag{5}$$

$$a_r(t) = \frac{\kappa}{\omega_1-\omega_2}(e^{i\omega_1 t}-e^{i\omega_2 t}), \tag{6}$$

where $$\omega_{1,2} = \frac{1}{2}(\omega_s+\omega_r+i\gamma_s+i\gamma_r) \pm \frac{1}{2}[(\omega_s+\omega_r+i\gamma_s+i\gamma_r)^2+4(\kappa^2+\gamma_s\gamma_r-i\gamma_r\omega_s-i\gamma_s\omega_r-\omega_s\omega_r)]^{\frac{1}{2}}. \tag{7}$$

Accordingly, the energy oscillates back and forth between the resonators. From such oscillations, the intrinsic parameters are determined, and hence, the transfer efficiency using Equation (4).

Certain embodiments operate in accordance with examples represented via the finite-different-time-domain (FDTD) method. All materials are assumed to be copper with conductivity of $\sigma=5.8\times10^7$ S/m. The central operating frequency is 10 MHz, corresponding to a wavelength of 30 m. For the inductor coil, the size of the coil is 0.8 m×0.8 m, and the cross section of the wire is square (0.04 m×0.04 m). For the capacitor, the plates have the size of 0.6 m×0.6 m. The distance between the plates of the capacitor is 0.04 m. The systems operate in a regime such that both the size of the resonators and the distance between them are deep subwavelength. The distance between the coil and its nearest metallic plane is 0.6 m. A magnetic dipole source is excited at the middle of the source coil. The source has a Gaussian-like profile in time and its central frequency is the resonant frequency of the resonators. The magnetic field has a direction perpendicular to the coil plane, at symmetrical monitor points placed near the source and receiver coil.

In certain embodiments, such as that shown in FIG. 1, nearly complete energy exchange between the resonators is achieved, with the envelope of field amplitudes confirming/operating in accordance with a coupled mode in which $T\equiv\pi/2\kappa$ describes the time it takes for the energy to go from a source to a (symmetrical) receiver (e.g., $T\approx7.5$ μs for various embodiments). A coupled mode theory indicates that the resonator in the presence of the metallic planes, in certain embodiments, has a lifetime of $T_r=1134$ μs. Because $T<<T_r$, such in embodiment is in the "strong" coupling regime. Using Equation (4), the transfer efficiency is shown to be 97%.

In certain embodiments, the transfer efficiency is determined to be a function of coil-to-coil spacing for wireless energy transfer. The efficiency can decay slowly as a function of distance, but can be maintained above 90% for a distance shorter than 2.8 m. In accordance with this recognition/discovery, various embodiments are directed to wireless energy transfer at distances of less than 2.8 m, and in some instances, less than 1/10$^{th}$ or 1/15$^{th}$ of the wavelength of the electromagnetic wave used to transfer energy. Accordingly, various aspects of the present disclosure achieve wireless power transfer with efficiency as high as 97% with a transfer distance of approximately λ/15 with an operating frequency of 10 MHz, (corresponding to a transfer distance of 2 m). In certain embodiments, the transfer efficiency is greater 97%, which is achieved by increasing the size of the metallic plane.

Various aspects of the present disclosure are directed to a wireless power transfer system that influences both the resonant frequency and the quality factor of the resonator shift. Accordingly, the performance of the wireless power transfer system, in certain embodiments, changes when the environment alters. Certain embodiments are directed to adjusting aspects of the system to suit such environmental alterations. For example, using an aluminum plate next to a resonator, a transfer efficiency of approximately 84% can be re-tuned via the coupling coil size to match impedance and achieve a transfer efficiency of about 94.5%. Other embodiments are directed to the use of matching backing plates in such an embodiment that facilitate an increase in transfer efficiency to about 93.3% (e.g., without other tuning of the system). In still other embodiments, both the use of symmetrical plates and tuning of coupling coils are used to achieve an increase in transfer efficiency to about 95.5%.

The embodiments and specific applications discussed herein may be implemented in connection with one or more of the above-described aspects, embodiments and implementations, as well as with those described in the above-referenced provisional patent document, and shown in the figures that form part of that patent document.

While the present disclosure is amenable to various modifications and alternative forms, specifics thereof have been shown by way of example in the drawings and will be described in further detail. It should be understood that the intention is not to limit the disclosure to the particular embodiments and/or applications described. For example, certain embodiments of the present disclosure use a metallic plane on the source side. In other embodiments, there is no metallic plane on the source side. In other embodiments, the orientation of the coils is altered. Additionally, the capacitor plates can be aligned in various configurations. Accordingly, the intention is to cover all modifications, equivalents, and alternatives falling within the spirit and scope of the present disclosure.

What is claimed is:

1. An apparatus comprising:

a first resonator circuit having a capacitor with opposing capacitive plates and an inductive coil connected to the capacitive plates;

a second resonator circuit having a capacitor with opposing capacitive plates and an inductive coil connected to the capacitive plates;

the first and second resonator circuits being configured and arranged with parallel alignment of the capacitors and parallel alignment of the inductive coils to facilitate alignment of an electromagnetic field therebetween;

the second resonator circuit being configured and arranged to transmit sub-wavelength electromagnetic energy to the first resonator circuit at a resonant frequency matched to a resonant frequency of the first resonator circuit, by passing an electromagnetic wave in the electromagnetic field;

a reflective body coupled to the first resonator circuit and configured and arranged to reflect a portion of the sub-wavelength electromagnetic energy, transmitted by the second resonator circuit, back toward the second resonator circuit; and an electromagnetic energy reflector configured and arranged with the reflective body to mitigate loss of the sub-wavelength electromagnetic energy transmitted by the second resonator circuit by bouncing the sub-wavelength electromagnetic energy between the electromagnetic energy reflector and the reflective body to facilitate an absorption of the sub-wavelength electromagnetic energy by the first resonator circuit.

2. The apparatus of claim 1, wherein the second resonator circuit and the electromagnetic energy reflector are embedded within a surface upon which vehicles pass, and are configured and arranged to transmit the sub-wavelength electromagnetic energy to the first resonator circuit embedded in a vehicle passing over the surface.

3. The apparatus of claim 1, wherein the second resonator circuit is configured and arranged to transmit the electromagnetic energy at a distance between the first resonator circuit and the second resonator circuit of at least 10 centimeters and less than one-tenth of the wavelength of the electromagnetic wave.

4. The apparatus of claim 1, wherein the at least one of the first and second resonator circuits is configured and arranged to maintain a symmetry between the first resonator circuit and the second resonator circuit by automatically frequency-matching the resonator circuits.

5. The apparatus of claim 4, wherein the second resonator circuit is configured and arranged to automatically frequency-match the first resonator circuit and the second resonator circuit by adjusting a size of the inductive coil of the second resonator circuit.

6. The apparatus of claim 1, wherein the electromagnetic energy reflector includes a planar conductive plate in parallel to the capacitive plates of both the first resonator circuit and the second resonator circuit.

7. The apparatus of claim 1, wherein the electromagnetic energy reflector includes a planar conductive plate in parallel to both the capacitive plates and the inductive coils of both the first resonator circuit and the second resonator circuit.

8. The apparatus of claim 1, wherein the electromagnetic energy reflector includes a planar conductive plate perpendicular to the capacitive plates of both the first resonator circuit and the second resonator circuit and parallel to the inductive coils of both the first resonator circuit and the second resonator circuit.

9. The apparatus of claim 1, wherein the second resonator circuit is a high Q resonator circuit configured and arranged to transmit the sub-wavelength electromagnetic energy via an electric dipole moment that is about perpendicular to the electromagnetic energy reflector.

10. An apparatus comprising:

a charging circuit;

a first high Q resonator circuit connected to the charging circuit and having a capacitor with opposing capacitive plates and an inductive coil connected to the capacitive plates, the first high Q resonator circuit being configured and arranged to receive sub-wavelength electromagnetic energy and to provide the received sub-wavelength electromagnetic energy to the charging circuit;

a second high Q resonator circuit having a capacitor with opposing capacitive plates and an inductive coil connected to the capacitive plates, the second high Q resonator circuit being configured and arranged to transmit the sub-wavelength electromagnetic energy to the first high Q resonator circuit, by passing an electromagnetic wave in an electromagnetic field aligned between the first and second high Q resonator circuits via parallel alignment of the capacitors and parallel alignment of the inductive coils, using a resonant frequency matched to a resonant frequency of the first high Q resonator circuit;

a reflective body coupled to the first high Q resonator circuit and configured and arranged to reflect a portion of the sub-wavelength electromagnetic energy, transmitted by the second high Q resonator circuit, back toward the second high Q resonator circuit; and an electromagnetic energy reflector configured and arranged with the reflective body to reflect the sub-wavelength electromagnetic energy transmitted by the second high Q resonator circuit between one another to facilitate an absorption of the sub-wavelength electromagnetic energy by the first high Q resonator circuit.

11. The apparatus of claim 10, wherein the charging circuit is configured and arranged to use the sub-wavelength electromagnetic energy provided by the first high Q resonator circuit to charge a power device.

12. The apparatus of claim 10, wherein the charging circuit and the first high Q resonator circuit are coupled in a vehicle having a charge storage device and a drive system configured and arranged to move the vehicle, and the charging circuit is configured and arranged to supply charge to at least one of the charge storage device and the drive system with energy using the sub-wavelength electromagnetic energy received from the second high Q resonator circuit by the first high Q resonator circuit and provided to the charging circuit, the vehicle including the reflective body.

13. The apparatus of claim 12, wherein the second high Q resonator circuit and the electromagnetic energy reflector are embedded within a surface upon which vehicles pass, and are configured and arranged to transmit the sub-wavelength electromagnetic energy to the first high Q resonator circuit in the vehicle as the vehicle passes over the second high Q resonator circuit, and the electromagnetic energy reflector is embedded in the surface and below the second high Q resonator circuit and configured and arranged to reflect a portion of the sub-wavelength electromagnetic energy reflected by the reflective body.

14. The apparatus of claim 13, wherein the first high Q resonator circuit and the second high Q resonator circuit are configured and arranged to facilitate a transmission of the sub-wavelength electromagnetic energy from the second high Q resonator circuit to the first high Q resonator circuit at a distance between the respective high Q resonator circuits of at least 10 centimeters and less than one-tenth of a wavelength of the electromagnetic wave.

15. The apparatus of claim 10, wherein the second high Q resonator circuit is configured and arranged to maintain a symmetry between the second high Q resonator circuit and the first high Q resonator circuit by automatically frequency-matching the first high Q resonator circuit and the second high Q resonator circuit.

16. The apparatus of claim 15, wherein the second high Q resonator circuit is configured and arranged to automatically frequency-match the first high Q resonator circuit and the second high Q resonator circuit by adjusting a size of the inductive coil of the second high Q resonator circuit.

17. The apparatus of claim 10, wherein the electromagnetic energy reflector includes a planar conductive plate in parallel to the capacitive plates of both the first high Q resonator circuit and the second high Q resonator circuit.

18. The apparatus of claim 10, wherein the electromagnetic energy reflector includes a planar conductive plate in parallel to the capacitive plates and inductive coils of both the first high Q resonator circuit and the second high Q resonator circuit.

19. The apparatus of claim 10, wherein the electromagnetic energy reflector includes a planar conductive plate perpendicular to the capacitive plates of both the first high Q resonator circuit and the second high Q resonator circuit and parallel to the inductive coils of both the first high Q resonator circuit and the second high Q resonator circuit.

20. The apparatus of claim 10, wherein the second high Q resonator circuit is configured and arranged to transmit the sub-wavelength electromagnetic energy via an electric dipole moment that is about perpendicular to the reflective body and electromagnetic energy reflector.

21. A system comprising a plurality of charging stations coupled to a power supply, each of the charging stations including:

a first resonator circuit configured and arranged to transmit sub-wavelength electromagnetic energy to a second resonator circuit, by aligning an electromagnetic field with the second resonator circuit and using a resonant frequency of the second resonator circuit, wherein a portion of an electromagnetic wave in the electromagnetic field is reflected back towards the first resonator circuit, and wherein the second resonator circuit uses the transmitted sub-wavelength electromagnetic energy to store charge for operating a vehicle;

an electromagnetic energy reflector adjacent the first resonator circuit and configured and arranged to redirect the reflected portion of the electromagnetic wave back towards the second resonator circuit to facilitate an absorption of the sub-wavelength electromagnetic energy by the second resonator circuit;

an identification circuit configured and arranged to wirelessly communicate with a circuit within the vehicle and to determine an identification of the vehicle therefrom; and a metering device configured and arranged to meter energy transferred to the second resonator circuit in the vehicle and facilitate a communication of data for assessing a fee for the transferred energy, based on the determined identification.

22. A method for transferring electromagnetic energy, the method comprising:

transmitting sub-wavelength electromagnetic energy from a first high Q resonator circuit to a second high Q resonator circuit connected to a charging circuit, each resonator circuit having a capacitor with opposing capacitive plates and an inductive coil connected to the capacitive plates, by aligning an electromagnetic field between the first and second high Q resonator circuits via parallel alignment of the capacitors and parallel alignment of the inductive coils, and passing an electromagnetic wave in the electromagnetic field using a resonant frequency matched to a resonant frequency of the first high Q resonator circuit, wherein a reflective body coupled to the second high Q resonator circuit reflects a portion of the sub-wavelength electromagnetic energy transmitted by the first high Q resonator circuit; and using an electromagnetic energy reflector to reflect portions of the sub-wavelength electromagnetic energy reflected by the reflective body, back towards the second high Q resonator circuit, to facilitate an absorption of the sub-wavelength electromagnetic energy by the first high Q resonator circuit.

23. The method of claim 22, further including adjusting a size of the inductive coil at the first high Q resonator circuit to achieve an impedance match of the inductive coil of the second high Q resonator circuit.

* * * * *